(12) United States Patent
Abrahams

(10) Patent No.: US 7,043,464 B2
(45) Date of Patent: *May 9, 2006

(54) METHOD AND SYSTEM FOR RECOMMENDING ELECTRONIC COMPONENT CONNECTIVITY CONFIGURATIONS AND OTHER INFORMATION

(75) Inventor: Marc David Abrahams, San Diego, CA (US)

(73) Assignees: Sony Corporation, (JP); Sony Electronics, Inc., Park Ridge, NJ (US)

( * ) Notice: Subject to any disclaimer, the term of this patent is extended or adjusted under 35 U.S.C. 154(b) by 45 days.

This patent is subject to a terminal disclaimer.

(21) Appl. No.: 10/446,425

(22) Filed: May 28, 2003

(65) Prior Publication Data

US 2003/0200186 A1    Oct. 23, 2003

Related U.S. Application Data

(63) Continuation of application No. 09/501,688, filed on Feb. 10, 2000, now Pat. No. 6,618,714.

(51) Int. Cl.
*G06F 15/18* (2006.01)

(52) U.S. Cl. .............................. 706/14; 706/46; 706/12

(58) Field of Classification Search ................. 706/14, 706/46, 12
See application file for complete search history.

(56) References Cited

U.S. PATENT DOCUMENTS

| | | | |
|---|---|---|---|
| 5,687,334 A | 11/1997 | Davis et al. | |
| 5,825,651 A | 10/1998 | Gupta et al. | |
| 6,334,127 B1 * | 12/2001 | Bieganski et al. | 707/5 |
| 6,349,352 B1 * | 2/2002 | Lea | 710/72 |
| 6,466,971 B1 | 10/2002 | Humpleman et al. | |
| 6,480,889 B1 | 11/2002 | Saito et al. | |
| 6,483,523 B1 | 11/2002 | Feng | |
| 6,492,999 B1 | 12/2002 | Fado et al. | |
| 6,618,714 B1 * | 9/2003 | Abrahams | 706/45 |
| 2002/0004753 A1 * | 1/2002 | Perkowski | 705/26 |
| 2003/0058277 A1 * | 3/2003 | Bowman-Amuah | 345/765 |

OTHER PUBLICATIONS

David Clark, CISCO Connect Online: It's Good for Business, Nov. 1997, IEEE, 1089-7801/97, 55-58.*
David Clark, CISCO Connect Online: Its Good for Business; 1997; IEEE 1089-7801/97; 55-58.

* cited by examiner

*Primary Examiner*—Joseph P. Hirl
(74) *Attorney, Agent, or Firm*—Lerner, David, Littenberg, Krumholz & Mentlik, LLP

(57) ABSTRACT

A computer-implemented method and system for recommending electronic component connectivity configurations and marketing information to users of certain electronic equipment based upon information received from the user. The method includes providing a user interface display containing data representing a group of predetermined user-selectable electronic components, receiving data representing a user-selected subset of electronic components from the group of predetermined user-selectable electronic components, retrieving from a database attributes associated with each component of the subset of electronic components, comparing the subset of electronic components with the associated attributes to determine an appropriate component configuration, and presenting data representing the electronic component configuration to the user.

63 Claims, 10 Drawing Sheets

METHOD AND SYSTEM FOR RECOMMENDING ELECTRONIC COMPONENT CONNECTIVITY CONFIGURATIONS AND OTHER INFORMATION

CROSS REFERENCE TO RELATED APPLICATIONS

This is a continuation of U.S. patent application Ser. No. 09/501,688, filed Feb. 10, 2000, now U.S. Pat. No. 6,618, 714, issued Sep. 9, 2003, entitled METHOD AND SYSTEM FOR RECOMMENDING ELECTRONIC COMPONENT CONNECTIVITY CONFIGURATIONS AND OTHER INFORMATION, the entire disclosure of which is hereby incorporated by reference.

FIELD OF THE INVENTION

The present invention relates to a method and system for recommending electronic component connectivity configurations to users of electronic components as well as other information such as enhancements and accessories, and, more particularly, the present invention relates to methods and systems for providing information relating to audiovisual (AV) components and their accessories to a user.

BACKGROUND OF THE INVENTION

At present, the popularity of electronic components for personal and professional use is on the rise. In particular, home/office entertainment equipment, which may include these electronic components, is becoming more prevalent and at the same time more and more complex. One reason for this increased complexity is due, in part, to the increasing number and variety of electronic components now available to an average consumer (or user). In particular, to name a few, there are general purpose computers and computer systems, AM/FM stereo tuners/receivers, phonograph players, amplifiers, pre-amplifiers, loud speakers, including, center channel speakers, subwoofers, surround sound systems, compact disc (CD) players, Mini Disc® (MD)[1] players, digital versatile disc (DVD) players, DAT recorder/players, tape cassette recorder/players, VCRs, conventional big screen and high definition (HD) televisions, cable and satellite dish signal sources, set top Internet systems, computer control systems, TiVo® (an MPEG-based storage of television programs without the need for a VCR), and the like.

[1]Mini Disc® is a registered trademark of Sony Corporation, Tokyo, Japan.

In addition, a user may be confronted with multiple brand names from which to choose, numerous models offered by each company, wide variations among the types of components to combine, compatibility or incompatibility among existing and new equipment, compatibility or incompatibility among present and future interface technology, such as analog and digital, COAX, RCA jacks, optical ports, etc. All of this equipment is referred to hereinafter collectively as electronic components or electronic equipment, with a subset being AV components or equipment, and related accessories.

It is not difficult to imagine that many users of electronic equipment may have difficulty connecting together each and every piece of the above-mentioned equipment. It is desirable to have most, if not all, of the equipment or components connected together, at least in an adequate configuration, so that the equipment performs in accordance with its intended purpose. It also is desirable to take full advantage of most, if not all, of the features made available by each component, without running afoul of incompatibilities between components. For instance, with respect to AV components, a DVD player may have optical input and output ports but the receiver may have only RCA jacks. Therefore, although it would seem most desirable to use the optical inputs and outputs of the DVD player, the user would instead have to use the RCA jacks to accommodate the receiver.

At present, to aid in configuring desired components together, users are resigned to reviewing product manuals for each component, contacting representatives from each vendor of each component, or getting assistance from other users of the same or similar components. Product manuals usually provide little, if any, specific connectivity configuration diagrams, such as wiring configurations, of a user's entire system components. One vendor may not have the information of the other vendors' components, which information may be needed to facilitate proper connection. This may be true especially where a user has old and outdated components combined with new or state of the art components and/or components from different vendors. Finally, the user may have to spend an inordinate amount of time determining the component configuration or worse yet have to rely on other users with the same or less knowledge than the user regarding connecting a system together.

As a result, a user is left with a rat's nest of wiring and input/output connectivity configurations, or options and diagrams that may need to be understood to achieve a working electronic component system.

In addition to the aforesaid difficulties, users of such electronic equipment may desire other information relating to such equipment. For instance, a user may currently own or intend to purchase certain equipment and may desire to know whether the equipment he or she is purchasing is considered to be top-of-the-line or just merely middle-range. The user also may want to determine which components are compatible, or better yet, work best with other components. Finally, the user may desire a "one-stop-shopping" experience and be able to have his or her electronic component system needs analyzed to determine the best combination of components, given certain user parameters. In addition, the user may want to know about the entire range of accessories available for a particular component.

Accordingly, there is a need for a method and system that provides a way of receiving such information about the user's current and prospective components and provides an appropriate component connectivity configuration to that user. In addition, upon receipt of personal information from the user, there is a need to provide additional suggestions and recommendations to persuade the user to buy enhancements, upgrades, additional or related equipment, as well as related merchandise such as peripherals, video cassettes, tape cassettes, CDs, DVDs, MDs, and the like.

SUMMARY OF THE INVENTION

In accordance with one aspect of the present invention, there is provided a computer-implemented method for presenting recommended electronic component connectivity configurations to a user. A preferred embodiment of this aspect of the present invention includes: providing a user interface display for displaying data representing at least a group of predetermined user-selectable electronic components; receiving data representing a user-selected subset of electronic components from the group of predetermined user-selectable electronic components; retrieving from a memory storage device attributes associated with each electronic component of the user-selected subset of electronic components; comparing the data representing the user-selected subset of electronic components and the associated attributes to determine a suitable electronic component connectivity configuration; and presenting data representing the electronic component connectivity configuration to the user. Desirably, the electronic components comprise AV components.

Preferably, the method according to this preferred embodiment includes providing a graphical user interface display for displaying graphical data. More preferably, the method includes presenting graphical representations of electronic component connectivity configurations of the user-selected subset of electronic components. Most preferably, the step of presenting graphical representatives of electronic component connectivity configurations includes displaying representations of electrical wires or signal cables (with certain wires being labeled) to show the connections among appropriate connectors on each electronic components of the user-selected subset of electronic components.

Desirably, this preferred embodiment further comprises: receiving personal information from the user; analyzing the personal information in conjunction with the user-selected subset of electronic components; and presenting recommendations of additional information, such as additional or different components or accessories, to the user. Preferably, this desired method includes forwarding information to the user relating to certain electronic components, other than those selected by the user in the user-selected subset of electronic components. Most preferably, the personal information is selected from a group consisting of user demographic data, historical purchase data, click stream data or user-provided data.

In a most preferred embodiment, the above preferred method further comprises retrieving technical specifications and connectivity information for at least one of the electronic components from the user-selected subset of electronic components. Most preferably, representative data of the electronic components is stored in an object-oriented database by type of electronic component.

Most preferably, the step of presenting the electronic component connectivity configuration comprises: presenting graphical representations of the user-selected subset of electronic components, including input and output ports; and presenting graphical representations of suggested electronic components not otherwise selected by the user but ones that the user may desire to purchase to enhance the user's system.

The method in accordance with the preferred embodiments described above may be accomplished through a textual display device, which is capable of displaying textual representations of available electronic components and able to receive user input and selection. Preferably, the textual display device may include an electronic component. More preferably, the electronic component is within the user's group of electronic components. Most preferably, the display device may comprise a DVD player, which includes a scrollable display screen.

The method in accordance with preferred embodiments described above also may be accomplished through a computer network. The network may include a local area network (LAN) or a wide area network (WAN). The network may also include a client/server network. Most preferably, the network comprises a global computer information network, such as the Internet.

In accordance with yet another aspect of the present invention, there is provided a computer-implemented method for providing recommendations to a user through a vendor web site accessible over a computer network by a plurality of users. The users may have user computers connected to the computer network for accessing the vendor web site.

A preferred embodiment of this aspect of the present invention includes: providing a vendor/user interactive web site containing data representing at least a group of predetermined user-selectable electronic components; receiving, electronically forwarded via the computer network, data representing a user-selected subset of electronic components from the group of predetermined user-selectable electronic components; storing the data representative of the user-selected subset of electronic components into an object-oriented database; identifying each electronic component from the user-selected subset with its associated technical attributes; comparing the technical attributes of the user-selected subset of electronic components to determine a suitable electronic component connectivity configuration; and electronically forwarding to the user, via the computer network, data representing the suggested electronic component connectivity configuration.

In accordance with a preferred embodiment of this aspect of the present invention, the step of providing a user interface display further comprises providing a graphical user interface display. More preferably, this step includes presenting a graphical representation of the electronic component connectivity configuration of the user-selected subset of electronic components. Most preferably, the graphical presentation includes displaying data representing electrical wires or signal cables (some being labeled) to show the connection of appropriate connectors on each electronic component of the user-selected subset of electronic components.

Desirably, this embodiment further comprises: receiving personal information from the user; analyzing the personal information in conjunction with the user-selected subset of electronic components; and presenting recommendations of additional components or accessories to the user. Preferably, this step of presenting recommendations includes forwarding information relating to vendor components, other than those selected by the user in the user-selected subset of electronic components. Desirably, the personal information is selected from a group consisting of user demographic data, historical purchase data, click stream data or user-provided data. Most preferably, the step of retrieving the technical attributes of each component comprises retrieving technical specifications and connectivity information for at least one of the electronic components from the user-selected subset of electronic components.

In a most preferred embodiment of this aspect of the present invention, the step of presenting the electronic component connectivity configuration comprises: presenting graphical representations of the user-selected subset of electronic components, including input/output ports or jacks; and presenting suggested electronic components that the user may want to purchase to enhance the user's electronic component system. Most preferably, the electronic components include AV components.

In accordance with yet another aspect of the present invention, there is provided, in a computer system for providing electronic component recommendations from a vendor computer to a user computer through a vendor web site accessible over a computer network by a plurality of users, the users having user computers connected to a computer network for accessing the vendor web site, a graphical electronic component generating system comprising a graphical electronic component generation program executable on the vendor computer and containing instructions for causing the vendor computer to generate an interactive vendor graphical electronic component display that represents the vendor's electronic components and interactively guides a user through the vendor computer web site. The graphical electronic component generation program is operative to send display commands to the user computer when the user computer has accessed the vendor web site causing the user computer to display, on a display device associated with the user computer, the interactive vendor electronic components for selection by the user.

In accordance with a preferred embodiment of this aspect of the present invention, the vendor computer records the user-selected electronic components and records personal data provided by the user or acquired through historical data or click stream data. Preferably, the vendor computer comprises an artificial intelligence (AI) function that allows the vendor computer to analyze the user's electronic components selection and to recommend enhanced or additional electronic components in accordance with the user's personal preferences. More preferably, the AI function further analyzes the user's personal information to be able to cross-sell and up-sell additional vendor products, as these terms are described herein.

In accordance with still a further aspect of the present invention, there is provided a computer-implemented method for presenting recommendations to a user of electronic components. A method in accordance with a preferred embodiment of this aspect of the present invention comprises: providing, from a component object-oriented database, a user interface display containing data representing at least a group of predetermined user-selectable electronic components; receiving data representing a user-selected subset of electronic components from the group of predetermined user-selectable electronic components; retrieving, from an electronic component attribute gathering module, attributes associated with each component of the user-selected subset of electronic components; transferring the received data of the user-selected subset of electronic components and the associated attributes to an analysis engine having a rules database; analyzing the user-selected subset of electronic components and the associated attributes to determine a suitable electronic component connectivity configuration; and presenting data representing the electronic component connectivity configuration to the user.

Preferably, each electronic component object in the component object-oriented database contains technical information of each electronic component. The technical information preferably comprises the type of input/output ports or jacks associated with the electronic components. The technical information may also comprise the type of sound capability supported by the electronic components. Preferably, the type of sound capability includes digital sound capability. The technical information may also include the type of device bus associated with each electronic component.

In a preferred embodiment of this aspect of the present invention, there is provided an analysis engine which: examines attributes of the electronic components; and applies rules from the rules database to determine a suitable input/output component connectivity configuration, and to determine incompatibilities that may exist between the electronic components. Desirably, the suitable input/output component connectivity configuration comprises optical, RCA jacks or COAX connectivity configurations.

In another preferred embodiment, the user interface display comprises an electronic component. Most preferably, the electronic component comprises an AV component, such as a DVD player. In this preferred embodiment, data representing the group of predetermined user-selectable electronic components may be provided to the user in at least a textual format or in at least a graphical format.

In accordance with yet another embodiment of the above-mentioned aspects, there is provided a graphical user interface display, wherein data representing the group of predetermined user-selectable electronic components are displayed in at least one dialog box. Preferably, the group of predetermined user-selectable electronic components include separate electronic components that are each displayed in an associated dialog box, whereby the user is able to independently select or not select an electronic component from each dialog box. Each associated dialog box of each electronic component may contain at least one model of the associated electronic component. More preferably, each associated dialog box of each electronic component contains data representing a plurality of different models of the associated electronic component. The electronic components are preferably AV components, comprising an AM/FM receiver, an amplifier, a turntable, an equalizer, a CD player, a DVD player, a cassette recorder/player, a DAT player, a television, a HD television, a general purpose computer, a MD player, a TiVo® recorder/player, a video cassette recorder/player (VCR/P), or a laser disk player.

In the computer system aspect of the present invention as described above, a preferred embodiment is provided where the interactive vendor graphical electronic component display comprises at least one dialog box. Preferably, the interactive vendor graphical electronic component display includes representations of separate electronic components that are each displayed in an associated dialog box, whereby the user is able to independently select or not select an electronic component from each dialog box. More preferably, each associated dialog box of each electronic component contains data representing at least one model of the associated electronic component.

Alternatively, each associated dialog box of each electronic component contains data representing a plurality of different models of the associated electronic component. Most preferably, the electronic components are AV components. Desirably, the AV components comprise any one component from a group comprising an AM/FM receiver, an amplifier, a turntable, an equalizer, a CD player, a DVD player, a cassette recorder/player, a DAT player, a television, a HD television, a general purpose computer, a MD player, a TiVo® recorder/player, a VCR/P, or a laser disk player.

In another aspect of the present invention, there is provided a computer-implemented method for providing electronic component and related recommendations to a user of electronic components. A preferred method includes: providing a graphical user interface display containing data representing at least a group of predetermined user-selectable electronic components, each electronic component from the group of predetermined user-selectable electronic components being associated with its own dialog box; receiving data representing a user-selected subset of electronic components from the group of predetermined user-selectable electronic components; retrieving from a memory storage device attributes associated with each component of the user-selected subset of electronic components; comparing the user-selected subset of electronic components data and the associated attributes to determine a suitable electronic component connectivity configuration; and presenting data representing the electronic component connectivity configuration to the user.

Preferably, this method includes the step of providing an additional user interactive dialog box that is not associated with any predetermined electronic component. More preferably, the method includes the step of receiving at least one user-supplied electronic component from the user by way of the unassociated dialog box. Alternatively, a human operator performs the steps of receiving, retrieving and comparing. In this alternative, the user is able to communicate with the human operator. Preferably, the communication is via electronic communications. Alternatively, the communication is via voice communication.

In yet another aspect of the present invention, there is provided a computer-implemented method for determining electronic component connectivity configurations of a set of electronic components. A preferred embodiment of this aspect includes: providing an analysis engine; providing a rules database containing logic rules; analyzing known attributes of the set of electronic components; and applying logic rules from the rules database to determine a suitable electronic component connectivity configuration. Preferably, the analysis engine further determines incompatibilities that may exist between the electronic components.

DETAILED DESCRIPTION OF THE INVENTION

Figure 1A:
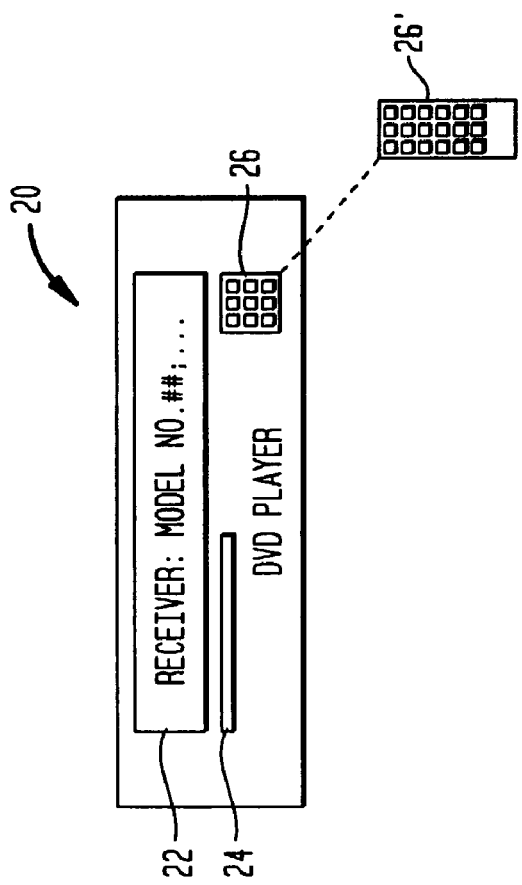
FIG. 1A is a schematic diagram of a display device in accordance with a preferred embodiment of the present invention.

Reference is now made to FIG. 1A, which illustrates a user interface display device 20 in accordance with a preferred embodiment of the present invention. The display device 20 in this preferred embodiment is a DVD player. However, one of ordinary skill in the art will appreciate the display device may be any type capable of interacting with a user and capable of displaying user-selectable electronic components. The display device 20 includes a display screen 22, a DVD drive 24, and a user interface unit 26. The interface unit 26 may be a numeric keypad, an alphabetic keypad, or an alphanumeric keypad. However, the interface unit 26 may be any type of keypad or other input device capable of selecting components from the display screen 22. For example, the interface unit may be remote from the display, such as what is shown by the remote control unit 26'.

Figure 1B:
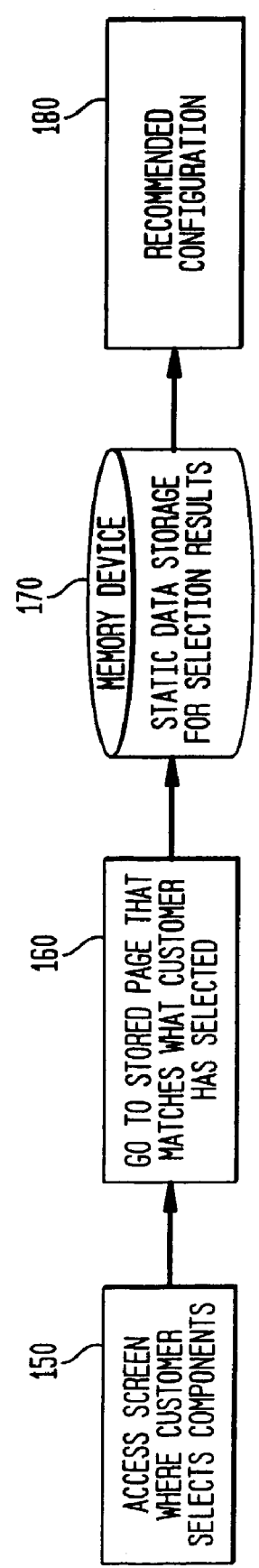
FIG. 1B is a flow chart of the steps followed in accordance with the preferred embodiment of FIG. 1A.

FIG. 1B illustrates a preferred method in accordance with the present invention. In operation, the user first places a DVD into the DVD drive 24 and activates the DVD player 20 to play the disk. The disk will contain a static memory of data representing predetermined electronic components from which the user may make his or her selection. The disk may contain other information such as advertisements, manufacturer notices, featured models or components, and the like. So, once the DVD has been loaded and activated to play, the user may begin to make selections.

As shown in step 150, a user may access the user interface display screen 22 for a display of, preferably, AV equipment or components available for configuring. The AV components may be displayed for selection by the user textually, one after the other. That is, the user-selectable components may be presented serially such that the user scrolls to the right or left, or up and down, the choices to make a selection. This scrolling is performed by using the user interface unit 26. The selection of AV components may be from one vendor or may comprise various vendors. The display of AV components may include solely text or solely graphics or both text and graphics.

The system 20 receives the user-selected subset of AV components and sends this information to a stored memory or page on the disk (not shown) that matches the user's selection as shown in step 160. As illustrated in step 170, the system then retrieves from the stored page the technical attributes associated with the subset of AV components. Then, the system 20 generates a user readable display of a suitable AV component connectivity configuration as shown in step 180. This display may comprise textual configuration instructions or may include graphics showing the AV components selected by the user and the connections between AV components or both text and graphics. These displays may include representations of electrical wires or signal cables, labeled either with written indicia or by way of color coding to guide the user when connecting his or her system together.

Figure 2:
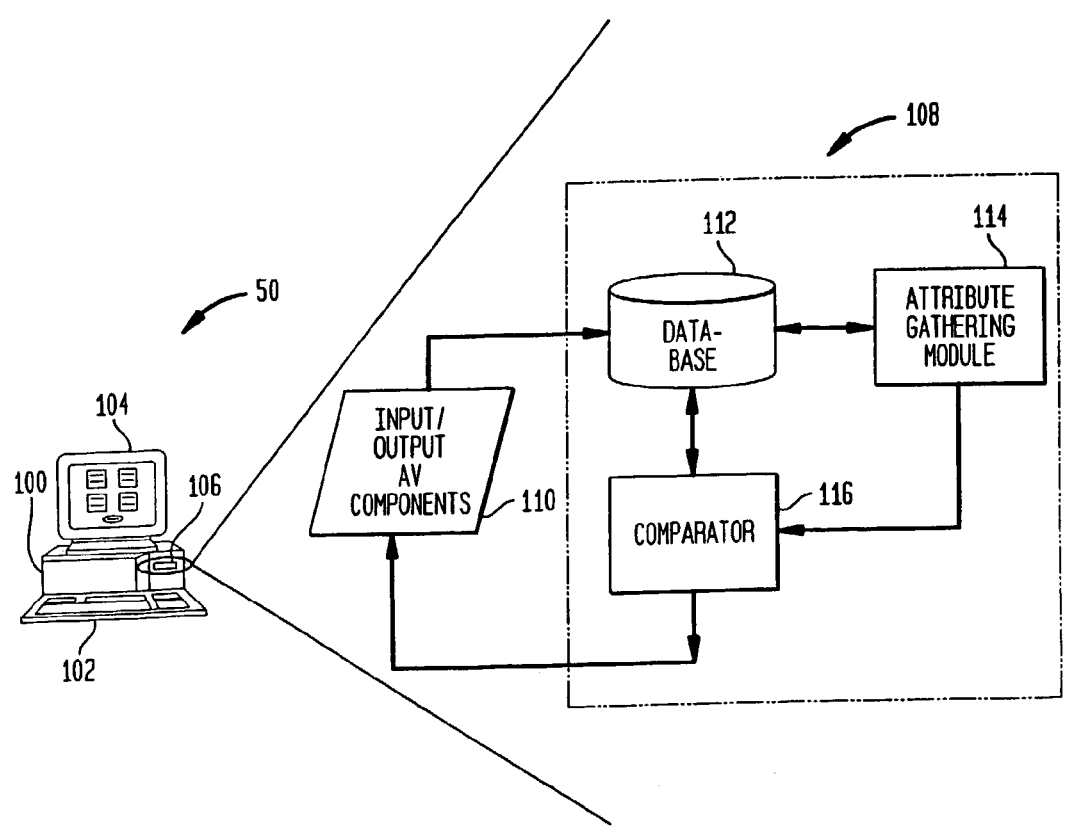
FIG. 2 is a schematic diagram of a computer system in accordance with another preferred embodiment of the present invention.

FIG. 2 illustrates a schematic diagram of a computer system 50 in accordance with another preferred embodiment of the present invention. The system includes a processing unit 100, data input device or keyboard 102, user interface display device or monitor 104, and data read device, or CD/ROM drive 106. The CD/ROM drive may instead be a tape drive, DVD drive or MD drive or any other drive device capable of receiving a memory storage from a known storage medium 108 (shown within the dash lines) such as a tape cassette, diskette, CD, DVD disc, MD or the like.

Any known, commercially available, computer hardware and system software may be utilized in instructing and controlling the processing unit 100, keyboard 102, monitor 104 and data storage device drive 106. Preferably, the computer system 50 includes an interface unit 110 for providing an interface between the processor 100 of the computer system 50 and the disc drive 106 to be able to access the storage medium 108, loaded in the disc drive 106.

The storage medium 108 preferably comprises a database 112, including an attribute gathering module 114 and a comparator 116. These portions of the storage medium 108 are accessible by the user through the interface module 110 allowing for input and output of electronic component information.

In this preferred embodiment, a user inserts the storage medium 108 into the storage device drive 106 and runs the software program associated with the storage medium 108. The running of the software program may be executed according to known methods of running software programs on a general purpose computer system such as a personal computer or client/server computer system. Those skilled in the art will appreciate that any means of running the software program embedded on the storage medium 108 is contemplated by the present invention and may be utilized in implementing the present invention.

Figure 3:
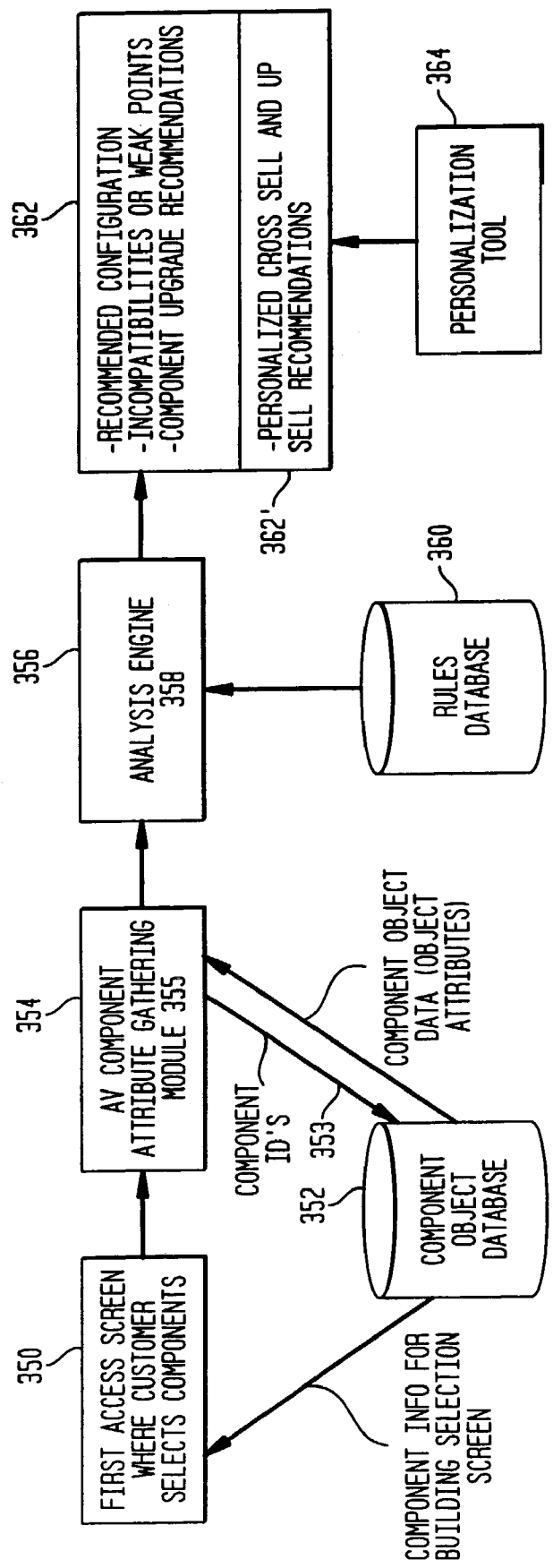
FIG. 3 is a flow chart of the steps followed in accordance with the preferred embodiment shown in FIG. 2.

The operation of the system 50, shown in FIG. 2, of the present invention will be described in general by way of the flowchart depicted in FIG. 3 and then later by way of a specific example. Turning now to FIG. 3, similar to the first step as described in FIG. 1B, step 350 provides for a first access screen where the user selects its subset of AV components. In this preferred embodiment of the present invention, the AV component information for building a user selection screen is derived from a component object-oriented database 352. The identification of each component 353 is also included in the component object-oriented database 352. These component IDs 353 include attributes connected to each AV component. These attributes may be technical in nature. That is, they may include the technical specification, wiring diagrams or other attributes of each AV component. In addition, they may include other aspects of the component, such as the power rating of each component or the amount of power that each component is capable of accepting, the types of input and output ports available on each component, ranging from RCA jacks, COAX or optical ports. In addition, the technical attributes may include whether the component is capable of handling S-Link, IEEE 1394-fire wire, control A1 or any other future interface standard.

Figure 4:
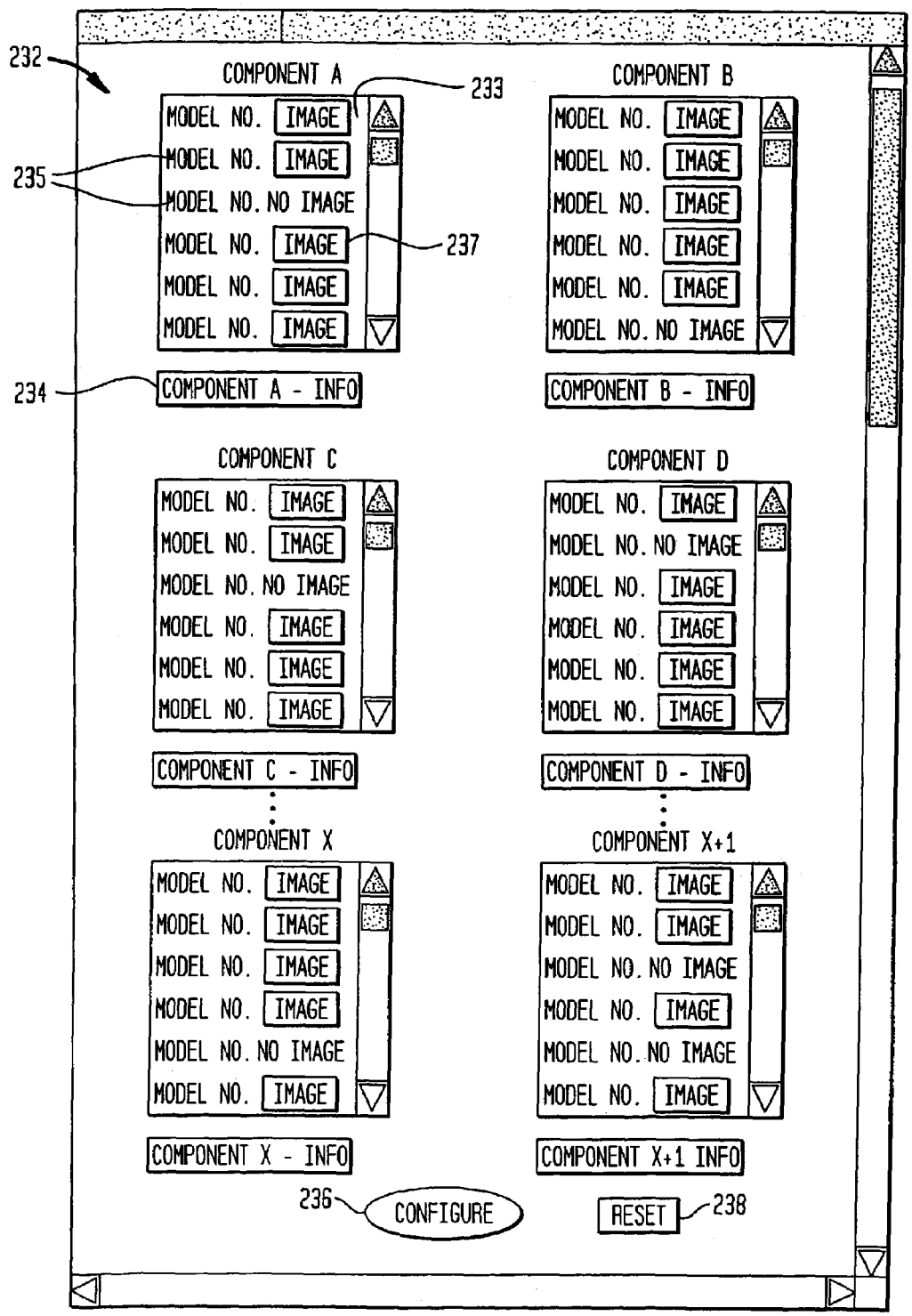
FIG. 4 is a depiction of a user interface display screen of a display device for displaying electronic components selectable by a user.

Graphical representations, including animation, may be created using commercially available animation tool software, such as Shock Wave™ technology. Each of the AV components can be represented by thumbnail images or text or both. Thus, the first screen preferably presented to the user according to step 350 is shown in FIG. 4 as a group of predetermined user-selectable electronic, or specifically, AV components. The user is prompted to highlight those components the user owns or those the user intends to include in his or her system. This prompting continues for as long as the user continues to select AV components to be added to the subset of AV components. After the user has made all selections desired, the user preferably completes his or her selection process by clicking on a "done" or "configure" button as shown in FIG. 4.

As shown at step 354, a system in accordance with this preferred embodiment collects the user-selected subset of AV components and gathers the AV component attributes using a gathering module 355. Then, it connects those attributes with the component selected by the user. In the next step 356, the component attributes of the AV component subset selected by the user are then analyzed by an analysis engine 358. This analysis engine preferably functions by using a rules database 360. The rules embedded in the rules database 360 are created as a set of conditions. That is, based on the subset of AV components analyzed by the analysis engine 358, a certain set of rules from the rules database 360 will be applied and a resulting suitable AV component connectivity configuration will be determined. The system 20 may, in addition, store the user-selected subset of AV components with their associated technical attributes for later use and compare them using comparator 116 to determine a suitable AV component connectivity configuration. This feature will also allow the system to personalize its interaction with the user the next time the user runs the program. That is, the system will now have information regarding the components the user has previously selected and retrieve this information during subsequent interactions with that user. As such, the present invention would be able to prompt the user that, for instance, a component in the user's possession has become obsolete and the new model is now available.

Once this information is collected, again, as shown in step 362, the present invention, in accordance with this preferred embodiment, provides a recommended configuration to the user. In addition, as shown in step 362, the system, in accordance with this preferred embodiment, may also identify incompatibilities or weak points in the user's entertainment system that may arise as a result of the analysis performed by the analysis engine 358 in accordance with the subset rules derived from the rules database 360.

In addition to the above AV component connectivity configurations, the present invention, in accordance with this preferred embodiment may also make component upgrade recommendations. Furthermore, as shown in step 362', the system in accordance with this preferred embodiment provides personalized cross-sell and up-sell recommendations to the user. Cross-selling is generally defined as providing suggestions for particular accessories to be used with the main system being sold. In this particular embodiment, a cross-sell may consist of a suggestion of a particular CD or DVD of interest to the user. An up-sell as described in this disclosure is defined as advising the user that the AV component they are using, for example, brand X, does not have the same capabilities as that of, for example, brand Y. Therefore, the user should purchase a brand Y component in place of the brand X that he or she currently possesses, specifying the advantages over existing equipment.

The ability to cross-sell and up-sell and make other personalized recommendations to the user is accomplished by the personalization tool 364 as shown in FIG. 3. Any known commercially available personalization products may be used in implementing the personalization tool 364 in connection with this preferred embodiment of the present invention. One such personalization tool is Net Perceptions®, which can be utilized in implementing this invention. Another is DataStage®, which uses established modifiable rules and product catalogs to make the recommendations of other products that should be of interest to the user. In addition, there are other custom-built personalization tools that can be created and used in conjunction with the present invention.

FIG. 4 illustrates a sample user interface display screen 230 as it would appear on a typical Windows®-type user interface program screen. As shown, a user is presented dialog boxes, each dedicated to a separate AV component of a typical entertainment system. Specifically, the first dialog box 232 for component A, may represent all available receivers. This dialog box 232 includes a scrollable subscreen 233, which contains various receiver model numbers 235 and images 237 (where available) of all type A components. The user is prompted to "click" on the particular model number of interest. When so doing, that particular component is highlighted and the user may further access more information 234 about the component selected. Alternatively, next to each model number 235 and image 237, there may be a user selectable icon (not shown) for gathering further information on the component chosen by the user before the user finally selects the particular model.

As can be readily seen in FIG. 4, the user is prompted to continue to the next dialog box, selecting those components of interest or ones the user currently owns. Once the user has completed the selection process, the user then clicks on the "Configure" icon 236. This action sends the user-selected subset of AV components from the group of pre-determined user-selectable AV components to the AV component attribute gathering module 355 (FIG. 3). Should the user make a mistake or change his or her mind during the selection process, he or she is able to reset that particular selection of a particular component in a dialog box, or reset the entire selection of all components with reset button 238.

Figure 5:
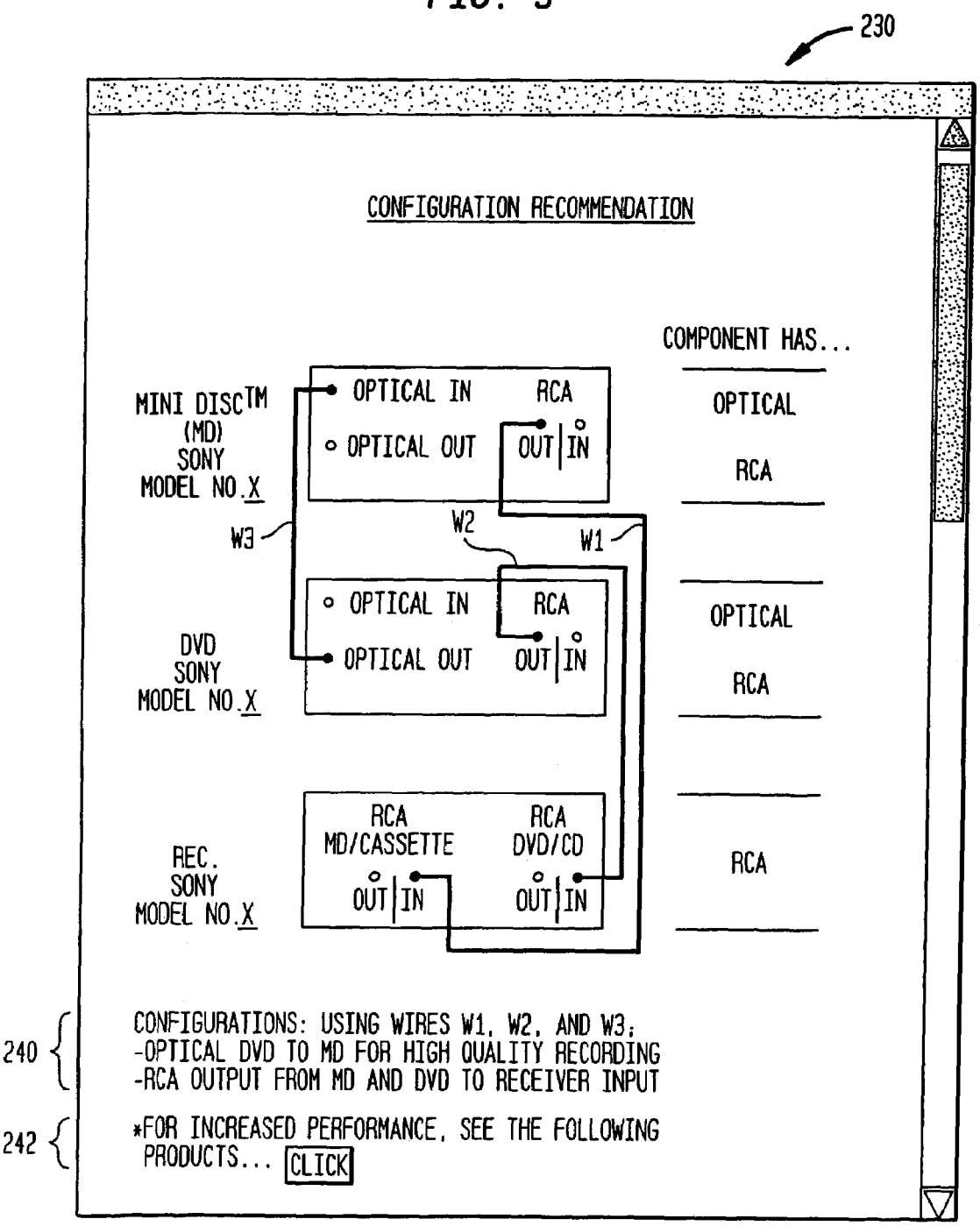
FIG. 5 is a depiction of a user interface display screen of a display device for displaying recommended electronic component connectivity configurations and other information.

FIG. 5 illustrates the presentation of the AV component connectivity configuration generated by the system 50 to the user after most calculations and analyses have been performed by the system 50. In this regard, the user in this preferred embodiment is presented with the same display screen 230 as shown in FIG. 4, but now illustrating those components selected by the user along with a connectivity diagram showing the most suitable selection of connections for those given AV components. Also provided by the system is a textual step by step instruction 240 regarding how to configure these wirings or cablings of the users' entertainment system. The wires or cables may be labeled W1, W2 and W3, etc., for ease of reference. The labeling may consist of other symbols or indicia to aid the user in connecting the components together.

In addition to the textual instructions 240 of how to configure the particular AV components selected by the user, there is provided additional textual indicia 242, which is a result of the analysis that the system has performed in terms of the AV component selected by the user. That is, when the system reviews the user-selected subset, the system analyzes whether the AV components currently existing in that subset are the most appropriate components in combination for that user. In addition, the system checks to see if the AV components selected are the most advanced, the best and the most suitable components available from the particular vendor. In that way, this aspect of the present invention can provide an immediate means of selling and marketing enhanced AV components to the user, knowing that the user has not selected these components and therefore most likely does not own them at the time.

As part of the gathering process for providing this additional information to the user, the system, in accordance with this embodiment of the present invention, in addition to receiving AV component information, additionally receives personal information from the user and analyzes that personal information in conjunction with the user selected subset of AV components. Once the system has done so, it then presents additional recommendations to the user. These recommendations may consist of enhanced or higher level components and/or accessories that may be available to the user and further enhance the entertainment system as a whole.

In addition to the above-mentioned information, the system, in accordance with this preferred embodiment of the present invention, may provide to the user with information relating to accessories, such as CDs, videos and MDs and the like that may be of interest to the user. Such information is gathered either by way of user demographic data provided by the user to the system, historical purchase data either provided by the user or obtained by the vendor, click stream data, which is obtained by reviewing the actions key strokes of the user during an AV configuration session, or by any other means by which the vendor may receive such personal information.

Figure 6:
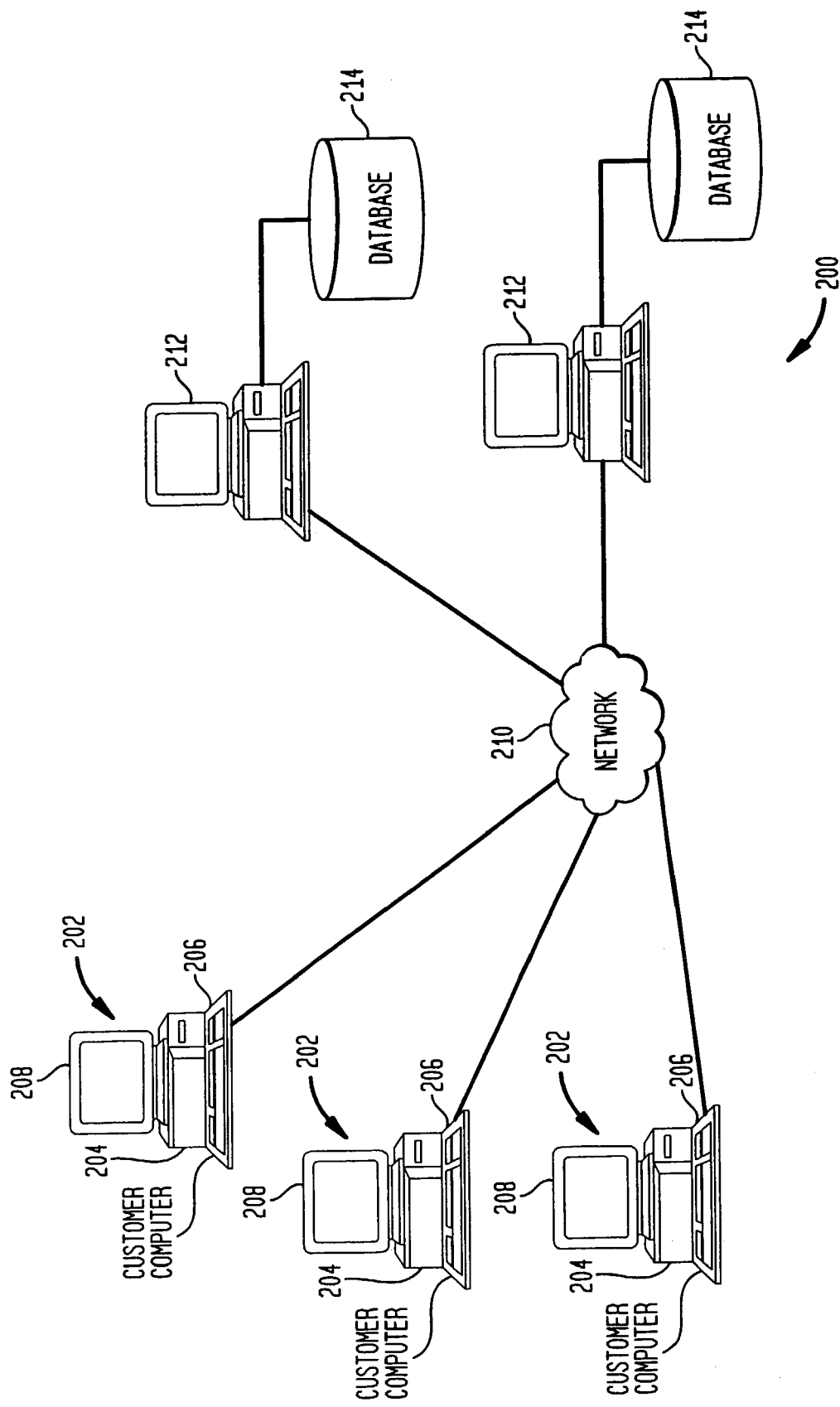
FIG. 6 is a schematic diagram of a computer network system in accordance with another preferred embodiment of the present invention.

In accordance with another preferred embodiment of the present invention, FIG. 6 illustrates a schematic diagram of a computer network system for recommending AV connectivity configurations and other related information, generally designated 200. This embodiment is similar to that described above in connection with FIGS. 2–5, however, this embodiment features a computer network. The computer network system 200 may include a group of user or customer computers 202, each including processing units 204 similar to that described in connection with FIG. 2. The customer computer 202 also includes a keyboard 206 and a monitor 208, as described in connection with FIG. 2. Embedded in each of these customer computers 202 is a database (not shown) for at least temporarily storing AV component information. This network system also includes an interface hub (or a network server) 210. Interfaced with the network server 210 are vendor computers 212 containing databases 214. The databases depicted in FIG. 6 contain the same or similarly stored information as the storage medium 108 depicted in FIG. 2, including but not limited to an attribute gathering module and a comparator. The use or operation as described in connection with FIGS. 2 and 3 is equally applicable to the preferred embodiment as described in FIG. 6, with the addition of the network 210 connection.

In particular, this preferred embodiment allows for multiple users or customers to access server computers 212 for information regarding AV configurations. For example, several users may desire to obtain an AV component connectivity configuration from the system 200. For instance, one or more of the customer computers 202 makes a request as described above in connection with FIG. 3. The information is transferred through the network 210 and into one of the network server computers 212. The server computer 212 then takes the user-selected subset of AV components from the group of pre-determined, user-selected AV components and transfers it to the database or storage medium 214, including its sub-modules, which determines which AV component connectivity configuration is most suitable for the particular user making the request.

The network that is depicted in FIG. 6 may be preferably a local area network, a wide area network, or a client/server network. Those having ordinary skill in the art will appreciate that any known, commercially available, networking system and networking software is contemplated by the present invention and within its scope.

Figure 7:
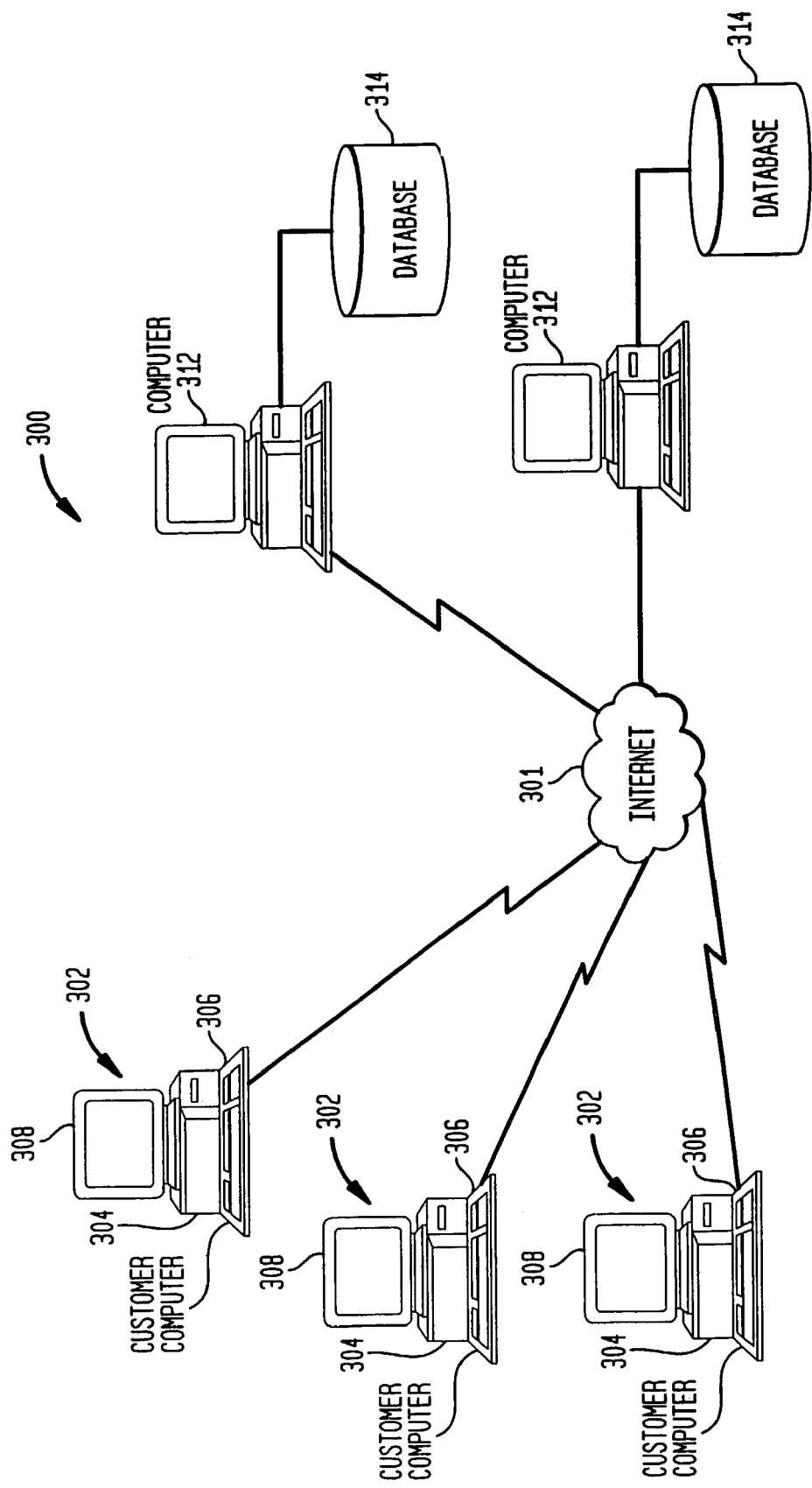
FIG. 7 is a schematic diagram of a computer network system in accordance with yet another preferred embodiment of the present invention.

FIG. 7 illustrates yet another preferred embodiment of the present invention. This system 300 includes a network system 301 utilizing a global communication computer network, such as the Internet. The customer or user computers 302 are similar to those as described in connection with FIGS. 2 and 6, with like reference numbers identifying like elements. Thus, as illustrated in FIG. 7, there is provided a computer system 300 for recommending AV components. Included are vendor computers 312, which are used to make the recommendations to the user computers 302 through a vendor web site accessible over the Internet 301.

In this preferred embodiment, the computer system 300 includes a graphical AV component generation program executable on the vendor computer 312 and contains instructions for causing the vendor computer to generate an interactive vendor graphical AV component display, which represents the vendor's AV components, and interactively guides the user through a vendor computer web site.

The graphical AV component generation program is operative to send display commands to the user computer 302 when the user computer has accessed the vendor web site. This causes the user computer to display on its monitor 308 the interactive vendor AV components for selection. An example of such a display would be one accessed through a global computer information network, such as the Internet. This example is similar to that described or shown in FIG. 4. However, because this particular embodiment is accomplished by way of an Internet connection, there is a URL address displayed at the top of the page (not shown).

Similarly, a screen display of recommendation to the user based on the user-selected subset may be used. Again, this display is similar to that shown in FIG. 5, except that it also includes a URL address at the top of the page (not shown).

As mentioned above, the analysis engine functions by utilizing a rules database. The rules are preferably created as a set of conditions. As an example of how the analysis engine uses the rules, the following illustration is presented.

Each component object in the object-oriented database will contain information including, but not limited to, the type of, and quantity of I/O ports, the type of digital sound capability supported, the type of device bus each component has, if any, and other attributes. The analysis engine will examine these attributes and use the rules in the rules database to determine the best I/O configuration (e.g., optical, RCA or COAX) to connect the components as well as point out any incompatibilities that may exist between components (e.g., a DVD player and receiver are chosen but neither one is capable of performing a Dolby 5.1 AC3 conversion).

For example, some of the rules would operate as follows:

IF DVD I/O has optical output and receiver has Dolby 5.1 AC3 converter, connect DVD optical output to receiver optical input.

ELSE IF DVD I/O has RCA output and receiver I/O has RCA input and receiver or DVD has Dolby 5.1 AC3 converter, connect DVD RCA output to receiver RCA input.

IF DVD I/O has optical output and RCA output and receiver I/O optical input and RCA input and DVD and receiver do not have Dolby 5.1 AC3 converter, alert user that Dolby 5.1 AC3 sound cannot be rendered from this selection without a Dolby 5.1 AC3 decoder adapter.

Recommend either a different DVD player or different receiver.

An order of priority in the rules would preferably be set. The better performance connections would be checked first. In this case, additional rules would be used to display the correct upgrade DVD and receiver to the customer.

In a preferred embodiment of the present invention, the system uses an object-oriented database in conjunction with an analysis engine and graphics technology to accomplish its task. A user who wants to know the correct connectivity configuration for AV components will select the components they have either purchased or plan to purchase. An item list will be created from information stored in the object database. After the components are selected, the customer requests a graphical representation and textual description of the optimum configuration.

When this request is made, the analysis engine will examine the components selected by the user by obtaining the corresponding attributes of that component, which are stored in the object database. The analysis engine uses the attributes of the objects as input for the configuration function of the analysis engine.

The configuration function will examine the possible setup configurations based on the selected AV components. The rule-based AI will be used to guide the configuration function to output the best possible configuration for the chosen AV component.

The output can be a textual description alone for devices using this tool that do not have graphics capability. Alternatively, the output can be graphical and textual for those devices that do support graphics.

Figure 8:
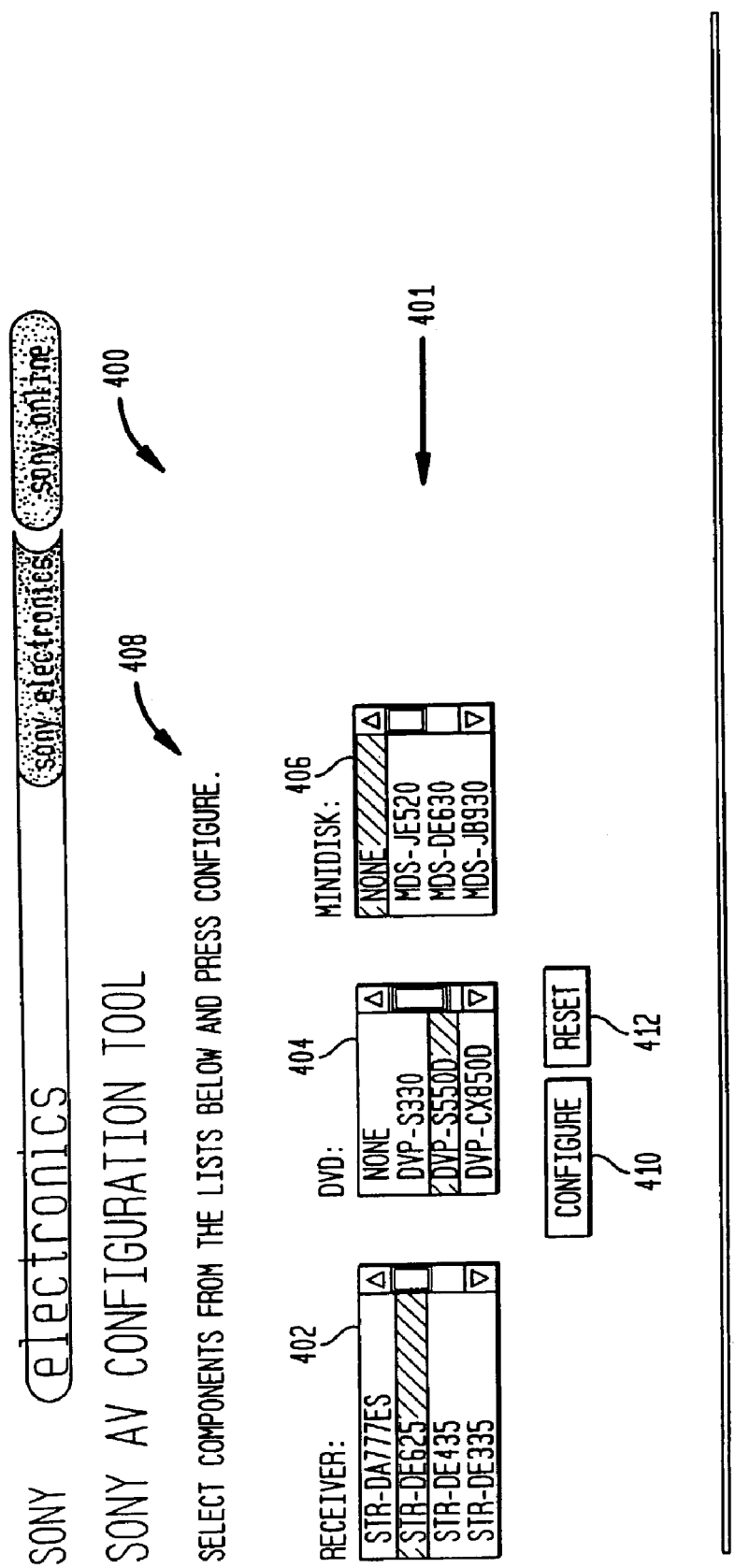
FIG. 8 is a depiction of a sample web site page relating to available electronic components and a user-selected subset of electronic components.

Referring now to FIG. 8, the preferred embodiments of the present invention will now be described by way of a specific example. A user of AV components may wish to obtain some assistance in connecting its various AV components together to achieve an acceptable or suitable AV component connectivity configuration, given the AV components in its current system.

In this regard, the user accesses the vendor's configuration tool web site 400. In this case, it is the Sony®[2] AV configuration tool web site. However, it can be any vendor's web site or a general web site representing many different vendors. Once accessed, the user is presented with a graphical user interface display 401 including several dialog windows. Each dialog window is dedicated to a particular component from which the user can choose. As shown in FIG. 8, the first dialog box 402 is dedicated to a receiver component. The various model numbers of the receiver are listed for selection by the user. Moving across the screen, the second dialog box 404 is dedicated to a DVD player from which the user may select. Finally, in this particular example, the final dialog box to the right of the screen 406 is dedicated to a MD player/recorder. The user is prompted by textual instructions 408 to select components from the list and then press "Configure" 410.

[2] Sony® is a registered trademark of Sony Corporation, Tokyo, Japan.

In this particular example, the user has chosen Receiver Model Number STR-DE625, DVD player Model Number DVP-S550D, and has selected "none" for the MD. Again, after the selections have been made, the user is prompted to click on the "Configure" button 410 to send this user-selected subset of AV components to the vendor, in this case Sony®. If, for instance, the user mistakenly chooses the wrong component or would like to start another session for any reason, the user may click the "Reset" button 412 to reset the selections and start again. After the vendor (or vendor computer) has received the user-selected subset of AV components, it performs the methods as described hereinabove to determine a suitable AV component connectivity configuration, given the input from the user.

Figure 9:
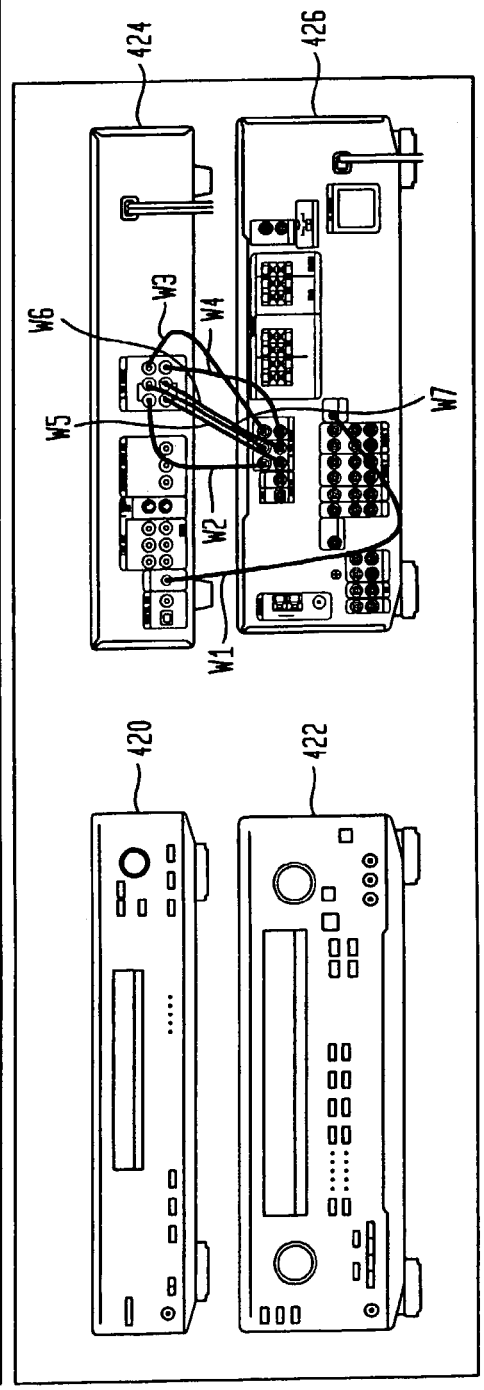
FIG. 9 is a depiction of a sample web site page relating to the presentation of electronic components selected by the user and a connectivity configuration.

As shown in FIG. 9, the vendor (or vendor computer) then sends a graphical display of the components selected by the user, along with the associated wiring and/or cabling diagram juxtaposed the graphical representation. The wires and cables are labeled with indicia such as W1, W2, W3, W4, W5, etc. In this way, the vendor presents the user with a textual description of the receiver, in particular receiver 416, and DVD 418. In addition, the vendor provides a picture of the components such as the DVD picture 420 and the receiver picture 422. The back panels of the components are displayed for purposes of showing the wiring configuration of the two AV components. These are shown, respectively, in FIG. 9 as DVD 424 and receiver 426.

Figure 10:
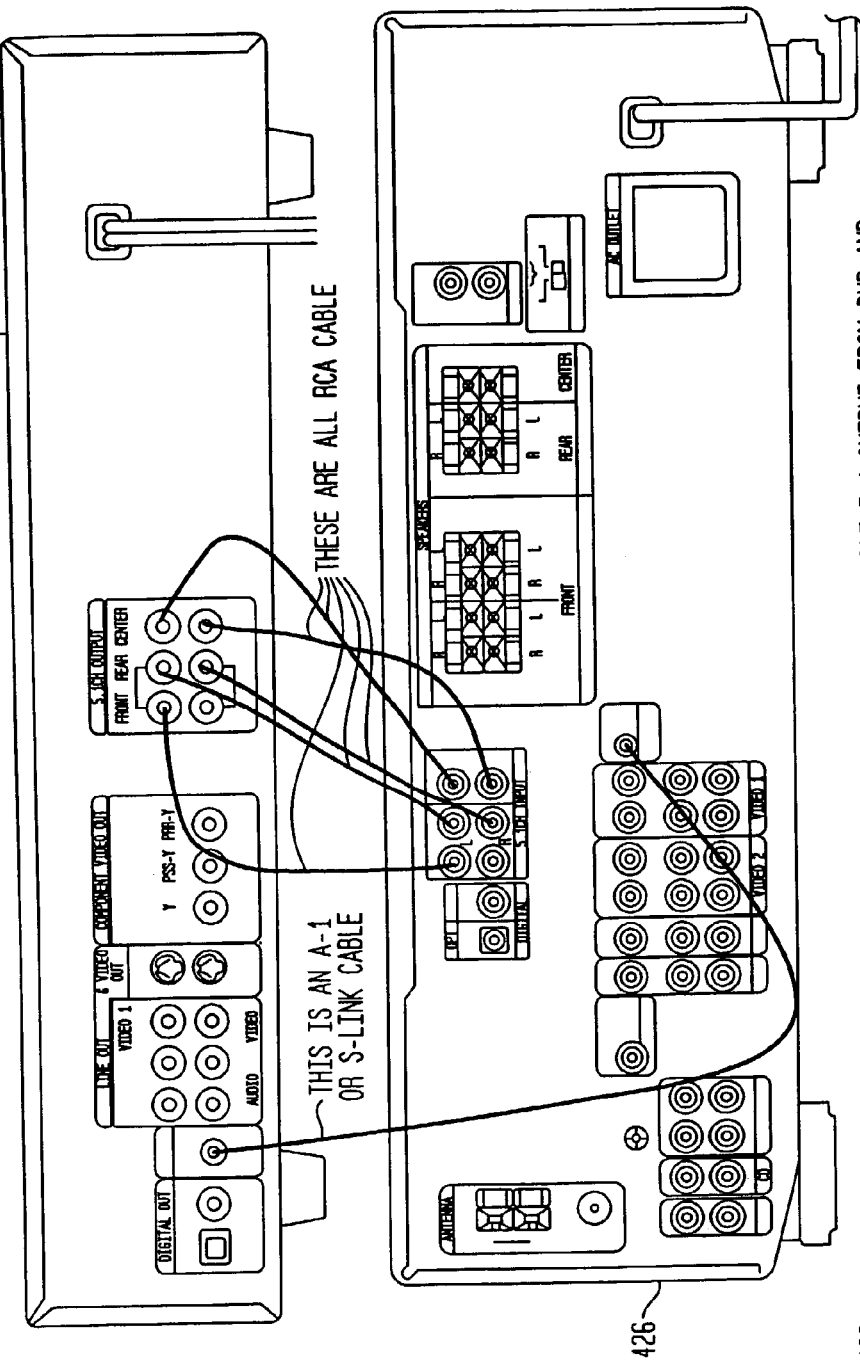
FIG. 10 is a depiction of a sample web site page relating to the connectivity configuration and instructional text.

The wiring and/or cabling diagram may be enlarged for further detail. As best shown in FIG. 10, all of the connectivity connections are shown in detail for the user to use for its wiring set up. In addition, the vendor provides a textual instruction 428 as to the advantages and disadvantages of these components, as well as, what capabilities the components have or do not have.

There are a number of alternatives, variations and modifications contemplated within the scope of the present invention. For example, those skilled in the art will appreciate that although the present invention has been described above as being implemented either through a portable storage medium, a LAN, or the like, or through the Internet, there are other ways of providing AV component connectivity configurations to a user. For instance, kiosks, which can access a live AV configuration tool, can be set up at retail stores where products are sold.

In addition, the CDs and DVDs can be created to contain the engine and databases, or they may contain a fixed set of static solutions and a fixed set of AV equipment. These CDs or DVDs can be distributed to purchasers of AV equipment. The functionality would appear the same as if they were using the live database and analysis engine. DVD players could then use the built-in pointing device, which is usually controlled by the component's remote, to operate the tool.

Part of the personalization aspect of the present invention is a method of capturing an Internet customer's preferences by getting direct input from the customer, observing what the customer is searching for, what the customers clicks on, and what the customer purchases. After the preferences have been captured, recommendation engines will be used, collaborative filtering and other methods to create an environment or to recommend products or services that would fit this particular user. The AV configuration tool examines what components the customer has selected and, along with other information gathered about this user, makes recommendation for products. Recommendations can be for other components, better components, or related products or services.

As another alternative or addition to the methods described above, if a user attempts to select an electronic component or a particular model that is not provided as one of the user-selectable electronic components, the system will provide a human assistant to the user. This assistant may communicate with the user via email, telephone, voice-net, interactive web page and the like. The user may also have the ability to email messages to a help desk that, in real time or otherwise, responds to the user's questions or concerns. These responses may include connectivity diagrams, selection of components, suggested purchases of components or accessories, and the like. An assistant may also direct the user to the nearest authorized dealer of the particular component of interest. This assistant may be a computer system or an actual human who is in communication with the user in some way.

As another alternative contemplated and within the scope of the present invention, there is provided a system and method that provides general default setups for the electronic components. However, if the system receives information from a user, then based on this information, the system provides alternative configurations. By way of example only, without prompting from the user, the system will provide the newest models available for each component and give the best configuration available, given these components. If the user submits information that informs the system the user has a receiver incapable of handling certain newer pieces of equipment, the system will provide the configuration that allows the user's system to work. In addition, however, the system will prompt the user regarding the loss of sound quality, power, effects, and the like, if the user decides not to purchase the newer receiver.

As these and other variations and combinations of features discussed above can be utilized without departing from the present invention as defined by the claims set forth below, the foregoing description of the preferred embodiments should be taken by way of illustration rather than by way of limitation of the present invention.

What is claimed is:

1. A computer-implemented method for providing recommendations to a user of electronic components, comprising:
providing a user interface display for displaying data representing at least a group of predetermined user-selectable electronic components;
receiving data representing a user-selected subset of electronic components from said group of predetermined user-selectable electronic components;
retrieving from a memory storage device attributes associated with each component of said user-selected subset of electronic components;
comparing said data representing said user-selected subset of electronic components with said associated attributes to determine a wiring configuration of said user-selected components suitably connecting said user-selected components; and
presenting data recommending said wiring configuration to the user.

2. The method of claim 1, wherein said electronic components comprise audiovisual (AV) components.

3. The method of claim 1, wherein said step of providing a user interface display further comprises providing a graphical user interface display for displaying graphical data.

4. The method of claim 3, wherein said step of presenting data recommending said wiring configuration to the user includes presenting graphical representations of said wiring configuration of said user-selected subset of electronic components to the user.

5. The method of claim 4, wherein said step of presenting said electronic component wiring configuration to the user includes displaying labeled wires or cables showing the connections of appropriate connectors on each electronic component of said user-selected subset of electronic components.

6. The method of claim 1, further comprising:
receiving personal information from the user;
analyzing said personal information in conjunction with said user-selected subset of electronic components; and
presenting recommendations of additional components or accessories to the user based upon said personal information.

7. The method of claim 6, wherein said step of presenting recommendations includes forwarding information to the user relating to electronic components other than those previously selected by the user in said user-selected subset of electronic components.

8. The method of claim 6, wherein said personal information is selected from a group comprising user demographic data, historical purchase data, click stream data or user-provided data.

9. The method of claim 1, wherein said step of retrieving said attributes of each electronic component comprises retrieving technical specifications and wiring information for at least one of said electronic components from said user-selected subset of electronic components.

10. The method of claim 1, wherein data representing said electronic components is stored in an object-oriented database by type of component.

11. The method of claim 1, wherein said step of presenting data recommending said wiring configuration comprises:
presenting graphical representations of said user-selected subset of electronic components including input and output ports; and
presenting suggested electronic components not otherwise previously selected by the user but ones that the user may desire to purchase to enhance the user's electronic component system.

12. The method of claim 1, wherein said computer-implemented method is accomplished through a computer network, said computer network being selected from a group comprising a local area network, a wide area network, a client/server network, or a global computer information network.

13. The method of claim 1, wherein said user interface display comprises an electronic component.

14. The method of claim 13, wherein said electronic component comprises an AV component.

15. The method of claim 14, wherein said electronic component is selected from a group comprising a DVD player, a CD player, a TiVo® player, a computer, a VCR player, or a MD player.

16. The method of claim 15, wherein data representing said group of predetermined user-selectable electronic components is provided to the user in at least a textual format.

17. The method of claim 15, wherein data representing said group of predetermined user-selectable electronic components is provided to the user in at least a graphical format.

18. A computer-implemented method for providing recommendations to a user of electronic components through a vendor web site accessible over a computer network by a plurality of users, the users having user computers connected to the computer network for accessing the vendor web site, comprising:
providing a vendor/user interactive web site containing data representing at least a group of predetermined user-selectable electronic components;
receiving, electronically forwarded via the computer network, data representing a user-selected subset of electronic components from said group of predetermined user-selectable electronic components;
storing said data representing said user-selected subset of electronic components into an object-oriented database;
identifying each of said user-selected subset of electronic components with its associated technical attributes;
comparing said technical attributes of said user-selected subset of electronic components to determine a wiring configuration appropriately connecting said user-selected components; and
electronically forwarding to the user, via the computer network, data recommending said wiring configuration.

19. The method of claim 18, wherein said step of providing a user interface display further comprises providing a graphical user interface display.

20. The method of claim 19, wherein said step of presenting data recommending said wiring configuration to the user includes presenting graphical data representing said wiring configuration of said user-selected subset of electronic components to the user.

21. The method of claim 20, wherein said step of graphically presenting data recommending said wiring configuration includes displaying labeled wires or cables showing the connection of appropriate connectors on each electronic component of said user-selected subset of electronic components.

22. The method of claim 18, further comprising:
receiving personal information from the user;
analyzing said personal information in conjunction with said user-selected subset of electronic components; and
presenting recommendations of additional components or accessories to the user.

23. The method of claim 22, wherein said step of presenting recommendations includes forwarding information relating to vendor components other than those previously selected by the user in said user-selected subset of electronic components.

24. The method of claim 22, wherein said personal information is selected from a group comprising user demographics data, historical purchase data, click stream data or user-provided data.

25. The method of claim 18, wherein said step of retrieving said technical attributes of each component comprises retrieving technical specifications and wiring information for at least one of said electronic components from said user-selected subset of electronic components.

26. The method of claim 18, wherein said step of presenting data recommending said wiring configuration comprises:
presenting graphical representations of said user-selected subset of electronic components, including input/output ports; and
presenting suggested electronic components the user may want to purchase to enhance the user's electronic component system.

27. The method of claim 18, wherein said electronic components comprise AV components.

28. In a computer system for providing recommendations from a vendor computer to a user computer through a vendor web site accessible over a computer network by a plurality of users, the users having user computers connected to a computer network for accessing the vendor web site, a graphical electronic component generating system comprising:
a graphical electronic component generation program executable on the vendor computer and containing instructions for causing the vendor computer to generate an interactive vendor graphical electronic component display that represents the vendor's electronic components and interactively guides a user through the vendor computer web site;
said graphical electronic component generation program being operative to send display commands to said user computer when said user computer has accessed the vendor web site causing said user computer to display on a display device associated with the user computer said interactive vendor electronic components for selection by the user; and
said graphical electronic component generation program receiving data representing a user-selected subset of electronic components from said interactive vendor electronic components for selection by the user such that a proposed wiring configuration of said user-selected electronic components appropriately connecting said user-selected electronic components is presented to the user.

29. The system of claim 28, wherein said vendor computer records data representing the electronic components selected by the user computer that interacts with the vendor web site and records personal data provided by the user or acquired through historical data or click stream data.

30. The system of claim 29, wherein said vendor computer comprises an artificial intelligence (AI) function whereby the vendor computer can analyze the user's electronic components and recommend enhanced or additional electronic components in accordance with the user's personal preferences.

31. The system of claim 30, wherein said AI function further analyzes the user's personal information to be able to cross-sell and up-sell additional vendor product.

32. The system of claim 23, wherein said electronic components comprise AV components.

33. The system of claim 28, wherein said interactive vendor graphical electronic component display comprises at least one dialog box.

34. The method of claim 28, wherein said interactive vendor graphical electronic component display includes data representing separate electronic components, each displayed in an associated dialog box, whereby the user is able to independently select or not select an electronic component from each dialog box.

35. The method of claim 34, wherein each associated dialog box of said each electronic component contains data representing at least one model of said associated electronic component.

36. The method of claim 34, wherein said each associated dialog box of said each electronic component contains data representing a plurality of different models of said associated electronic component.

37. The method of claim 34, wherein said electronic components comprise AV components.

38. The method of claim 37, wherein said AV components are selected from a group comprising: an AM/FM receiver, an amplifier, a turntable, an equalizer, a CD player, a DVD player, a cassette recorder/player, a television, a HD television, a general purpose computer, a MD player, a TiVo® recorder/player, a VCR/P, or a laser disk player.

39. A computer-implemented method for providing recommendations to a user of electronic components, comprising:
providing, from an object-oriented database, a user interface display containing data representing at least a group of predetermined user-selectable electronic components;
receiving data representing a user-selected subset of electronic components from said group of predetermined user-selectable electronic components;
retrieving, from an electronic component attribute gathering module, attributes associated with each electronic component of said user-selected subset of electronic components;
transferring said user-selected subset of electronic components and said associated attributes to an analysis engine having a rules database;
analyzing said user-selected subset of electronic components and said associated attributes to determine a wiring configuration of said user-selected components suitably connecting said user-selected components; and
presenting data recommending said wiring configuration to the user.

40. The method of claim 39, wherein each electronic component object in said component object-oriented database contains technical information of each electronic component.

41. The method of claim 40, wherein said technical information comprises the type of input/output ports associated with said electronic components.

42. The method of claim 40, wherein said technical information comprises the type of device bus associated with each electronic component.

43. The method of claim 39, wherein said technical information comprises the type of sound capability supported by said electronic components.

44. The method of claim 43, wherein said type of sound capability includes digital sound capability.

45. The method of claim 39, wherein said step of analyzing is performed by said analysis engine.

46. The method of claim 45, wherein said step of analyzing comprises:
examining attributes of said electronic components; and
applying rules from said rules database to determine an input/output wiring configuration suitably connecting said user-selected components and to determine incompatibilities that may exist among said electronic components.

47. The method of claim 46, wherein said input/output wiring configuration is selected from a group comprising optical, RCA or COAX wiring configurations.

48. The method of claim 39, wherein said electronic components comprise AV components.

49. The method as in claims 1, 18 or 39, further comprising providing a graphical user interface display, wherein data representing said group of predetermined user-selectable electronic components is displayed in at least one dialog box.

50. The method of claim 49, wherein said group of predetermined user-selectable electronic components include separate electronic components, each displayed in an associated dialog box, whereby the user is able to independently select or not select an electronic component from each dialog box.

51. The method of claim 50, wherein each associated dialog box of said each electronic component contains data representing at least one model of said associated electronic component.

52. The method of claim 50, wherein said each associated dialog box of said each electronic component contains data representing a plurality of different models of said associated electronic component.

53. The method of claim 50, wherein certain of said electronic components are AV components.

54. The method of claim 53, wherein said AV components are selected from a group comprising: an AM/FM receiver, an amplifier, a turntable, an equalizer, a compact disk (CD) player, a digital versatile disk (DVD) player, a cassette recorder/player, a DAT player, a television, a HD television, a general purpose computer, a MD player, a TiVo® recorder/player, a video cassette recorder/player (VCR/P), or a laser disk player.

55. A computer-implemented method for providing recommendations to a user of electronic components, comprising:
providing a graphical user interface display containing data representing at least a group of predetermined user-selectable electronic components, each electronic component from said group of predetermined user-selectable electronic components being associated with its own dialog box;
receiving data representing a user-selected subset of electronic components from said group of predetermined user-selectable electronic components;

retrieving from a memory storage device attributes associated with each component of said user-selected subset of electronic components;

comparing said user-selected subset of electronic components and said associated attributes to determine a wiring configuration suitably connecting said user-selected components; and presenting data recommending said wiring configuration to the user.

56. The method of claim 55, wherein said electronic components comprise AV components.

57. The method of claim 55, further comprising the step of providing a user interactive dialog box that is not associated with any predetermined electronic component.

58. The method of claim 57, further comprising the step of receiving data representing at least one user-supplied electronic component from said user by way of said disassociated dialog box.

59. The method of claim 58, wherein said steps of receiving, retrieving and comparing are performed by a human operator.

60. The method of claim 59, wherein the user is able to communicate with said human operator.

61. The method of claim 60, wherein said communication is selected from a group comprising electronic communications or voice communication.

62. A computer-implemented method for determining a wiring configuration of a set of electronic components, comprising:

providing an analysis engine;

providing a rules database containing logic rules;

analyzing known attributes of said set of electronic components;

applying rules from said rules database to determine a wiring configuration of said user-selected components appropriately connecting said user-selected components, and presenting data recommending said wiring configuration to the user.

63. The method of claim 62, wherein said analysis engine further determines incompatibilities that may exist between said electronic components.

* * * * *

UNITED STATES PATENT AND TRADEMARK OFFICE
CERTIFICATE OF CORRECTION

PATENT NO. : 7,043,464 B2 Page 1 of 1
APPLICATION NO. : 10/446425
DATED : May 9, 2006
INVENTOR(S) : Marc David Abrahams It is certified that error appears in the above-identified patent and that said Letters Patent is hereby corrected as shown below:

Col. 19, line 12, "claim 23," should read --claim 28,--.

Signed and Sealed this

Fourteenth Day of November, 2006

JON W. DUDAS
*Director of the United States Patent and Trademark Office*